Aug. 25, 1959
F. L. EVERETT
2,901,525
BREAKER MECHANISM FOR FRANGIBLE AMPOULE IN
DEFERRED ACTION PRIMARY CELL
Filed Sept. 11, 1943
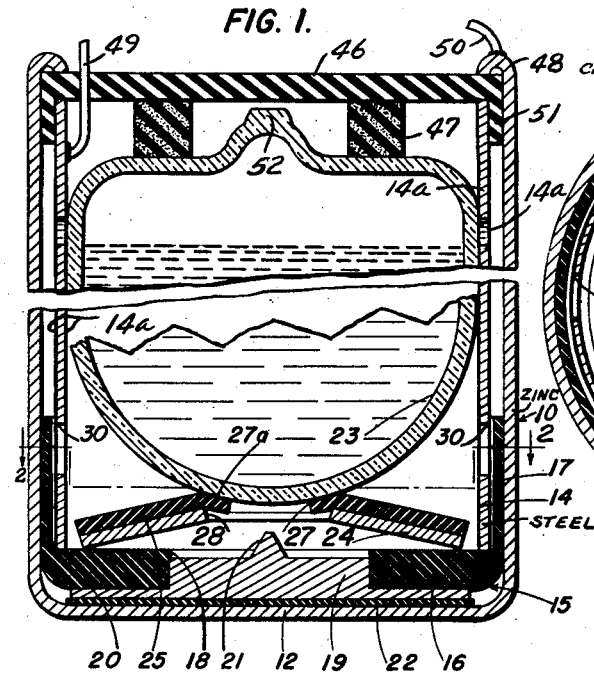
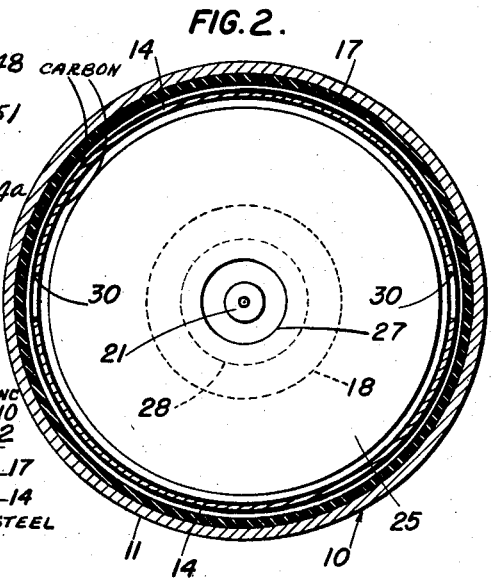
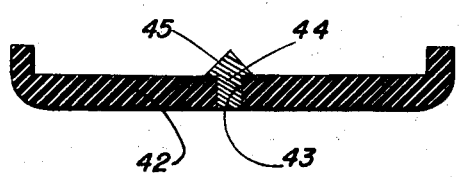
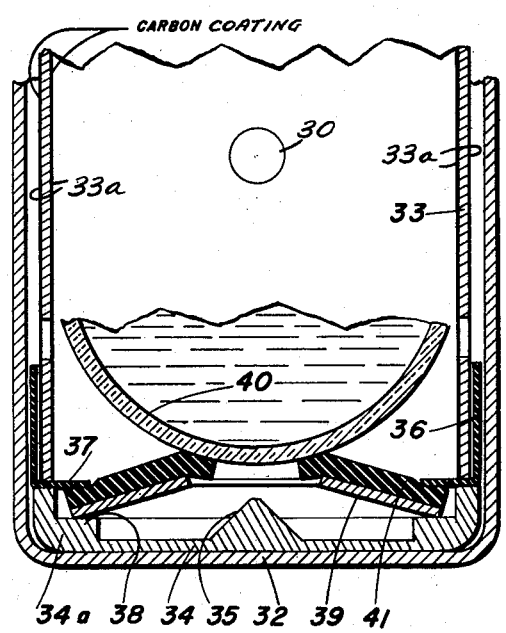
INVENTOR
FRANKLIN L. EVERETT
BY
ATTORNEY

2,901,525

BREAKER MECHANISM FOR FRANGIBLE AMPOULE IN DEFERRED ACTION PRIMARY CELL

Franklin L. Everett, Ann Arbor, Mich., assignor to the United States of America as represented by the Secretary of the Navy Application September 11, 1943, Serial No. 502,069

1 Claim. (Cl. 136—90)

This invention relates to batteries of the type used to provide operating voltages for projectiles, and the like, employing an electrical apparatus, such as an electrically detonated fuse. More particularly, the invention is concerned with a novel battery of this type having a breaker mechanism for fracturing an ampoule containing an electrolyte to activate the battery.

It has been proposed heretofore to provide, as a source of electromotive force in a projectile, or the like, a battery in which the electrolyte is contained in an ampoule so that the battery is normally maintained inactive by reason of the separation of its electrodes from the electrolyte in the ampoule, whereby the "shelf-life" of the battery is increased. When an electromotive force is required, the ampoule is broken to cause the electrolyte to contact the electrodes and activate the battery. It is desirable in batteries of this type to render the ampoule safe against accidental fracturing and to provide means for positively breaking the ampoule when the electromotive force is required.

One object of the invention, therefore, is to provide a battery cell for use in projectiles and including a breaker mechanism operable to fracture the ampoule when the projectile is accelerated, but which retains the ampoule against breakage by shocks incident to handling of the projectile.

Another object of the invention resides in the provision of a battery cell having a breaker mechanism of the character described in which the resilient push of a supporting spring washer is overcome under the force of setback to permit the ampoule to strike a breaker element or anvil with sufficient force to insure breakage of the ampoule.

A further object of the invention is to provide a battery cell of the character described which is of simple construction and, therefore, may be manufactured in quantity at low cost.

These and other objects of the invention may be understood by reference to the accompanying drawing, in which Fig. 1 is an axial sectional view of one form of cell embodying the invention, an intermediate portion being broken away;

Fig. 2 is a cross-sectional view of said cell, as indicated by broken line 2—2 of Fig. 1;

Fig. 3 is a fragmentary axial section of a modified form of cell, also embodying the invention; and Fig. 4 is a sectional view of a modified form of the breaker element or anvil.

Referring to Figs. 1 and 2 of the drawing, there is shown a deferred action battery cell comprising a can 10 of generally cylindrical form having a side wall 11 and a flat rear end 12. Preferably, the can is made of zinc and forms the negative electrode of the battery.

Mounted concentrically within the can 10 and spaced therefrom is a cylinder 14 made of steel coated with carbon 14a, on the surfaces as indicated in the drawing, and forming the positive electrode of the battery. In order to space the cylinder 14 from the can 10, there is provided an insulating spacing ring 15 having a relatively thick, internal flange 16, at its rear end and a relatively thin side wall 17. The rear flange 16 has a central opening 18 which receives a boss 19 on a fracturing element or anvil 20 disposed between the rear end of the can and the spacing ring 16. The boss 19 has an upstanding fracturing point 21 which is disposed axially of the can 10 and projects forwardly of the front face of flange 16. The anvil 20 is insulated from the rear end of the can by an insulating disk 22. If desired, the anvil 20, the disk 22, and the ring 15 may be made of insulating material in one piece, the material being hard enough to insure that the point 21 is capable of breaking the ampoule, as will be set forth in detail hereinafter.

An ampoule 23 is mounted concentrically within the electrode cylinder 14 in front of the anvil point 21, the ampoule being made of glass or other suitable frangible material. The ampoule contains an electrolyte for activating the battery cell, for example, dilute sulfuric, hydrochloric or phosphoric acid, to which a suitable depolarizer may be added, if desired.

In order to space the ampoule 23 in front of the point 21 of the anvil, there is provided a generally frustoconical spring washer 24, preferably of the well-known Belleville type. To provide additional cushioning means a rubber ring 25 may be cemented or otherwise secured to the front face of the washer 24. The central portion of the ring 25 around its opening 27 overhangs the rim of the washer opening 28 to form a dish-shaped seat 27a for the ampoule 23. Accordingly, a cushion is provided for the ampoule to protect it against breakage due to shocks incident to normal handling of the projectile. It will be understood that the front face of the flange 16 is smooth so as to permit free spreading of the outer rim of the spring washer 24 due to pressure from the ampoule 23.

The top of the cell may be closed in any suitable manner, for example by a cupped insulating member 46 whose depending flange 51 acts as a separator between the can 10 and the upper end of the steel electrode 14. The closure member 46 may be secured by crimping the top edge of the can 10 over it, as shown at 48. A suitable ring 47 of rubber or similar material is confined between the inside of the closure member 46 and the adjacent surface of the ampoule 23, and keeps the sealed tip 52 of the ampoule out of contact with the member 46, and also affords a yieldable cushion for the ampoule, to guard against breakage of the latter due to accidental mechanical shock. Conductors 49 and 50 are electrically attached to the electrodes 14 and 10 respectively, to constitute the output terminals of the cell.

In use, the battery is suitably mounted in the casing of the projectile with the rear end 12 of the battery can facing the rear or tail end of the projectile. When the projectile is fired, the ampoule 23 becomes shifted relatively rearwardly against the spring washer 24 by the resulting force of setback. Thereupon, the rear end portion of the ampoule 23, which is exposed through the opening 27, contacts the anvil point 21 with the result that the ampoule is fractured. The electrolyte within the ampoule then flows into contact with the electrode cylinder 14 and through openings 30 in the cylinder to the can 10 so as to activate the battery. When the battery is mounted in a projectile of the rotary type, the centrifugal force supplements the setback action to force the electrolyte outwardly under pressure into contact with the electrodes.

The battery cell shown in Fig. 3 comprises a can 32 forming the negative electrode and containing a cylindrical member 33 forming the positive electrode. The positive electrode is spaced in front of the rear end of the can by a breaking element or anvil 34 made of metal or other suitable material, the anvil overlying substantially the entire area of the rear end wall of the can. The anvil is provided with an axially disposed breaking point 35.

In order to insulate the positive electrode 33 from the anvil, there is provided an insulating ring 36 which may be made of a suitable plastic and includes an internal annular flange 37 at its rear end. The electrode 33, like electrode 14 of Fig. 1, may be made of steel, with a carbon coating 33a on its inner and outer surfaces. The side wall of ring 36 serves to space the electrode 33 from the side wall of the can, while the flange 37 of the ring serves to space the rear end of electrode 33 from the anvil 34.

The anvil 34 has a thickened marginal portion 34a forming a shoulder 38. A frusto-conical spring washer 39 is mounted within the can 32 and has its outer rim resting upon the shoulder 38 so that the washer may expand radially on the shoulder. The spring washer provides support for an ampoule 40 mounted in the can in front of the washer and in spaced relation to the anvil point 35. On the front face of the washer 39 is a cushioning ring 41 made of rubber or other suitable material. Like the washer 24 and the ring 25 (Fig. 1), the washer 39 and ring 41 are provided with central openings for exposing the rear end portion of the ampoule to the anvil point 35. The inner rim of the flange 37 overlies the outer marginal portion of the ring 41 and retains the ring 41 and the washer 39 against shoulder 38 so as to prevent displacement such as might otherwise occur after the ampoule has been broken.

Such a frusto-conical spring washer 39 has the characteristic that if opposing compressive forces act on its inner and outer edges, up to a certain total stress the washer will retain its initial general shape, but upon reaching a certain critical value, the frustum will suddenly become inverted. This provides a highly desirable "snap action" which ensures breakage of the ampoule.

The operation of the battery shown in Fig. 3 is similar to that of the form illustrated in Figs. 1 and 2. However, in the battery of Fig. 3, the ring 36 serves a threefold function. That is, the ring 36 spaces and insulates the electrode 33 from the can 32, spaces and insulates the electrode 33 from the anvil 34, and prevents displacement of the spring washer 39 and the ring 41 from shoulder 38.

Referring now to Fig. 4, there is shown a modified form of the breaker element or anvil which comprises a disc 42 made of Tenite or other suitable insulating material and having an axial opening 43. Mounted in the opening 43 is an anvil point 44 made of steel, or the like. The point 44 has a conical upper end portion 45 which projects in front of the inner face of the disc 42.

The anvil shown in Fig. 4 is characterized mainly by the use of an insulating disc supporting the anvil point 44 which is the only metal part in the anvil. The anvil may be used with deferred action battery cells of the type shown in Figs. 1 and 3.

In a companion case of H. H. Porter, Serial No. 521,250, filed February 5, 1944, for "Breaker Mechanism," now Patent No. 2,682,567, there is disclosed a somewhat similar device, but in which the spring washer is cupped oppositely to the one herein embodied, that is, in the present case the spring washer initially has its central opening uppermost, and the central portion of said washer supports the ampoule, whereas in the Porter case the spring washer has its outer edge portion uppermost and said edge portion supports the ampoule. This is the line of demarcation between the two cases.

It will be understood that various modifications in the constructions shown may be made without departing from the spirit of the invention. For example, the anvil point may be eliminated or greatly reduced in size, depending upon the type of ampoule used.

What is claimed is:

A primary cell comprising a can, a generally cylindrical electrode in the can, an insulating ring between the can and the electrode and having an internal flange, an anvil in the can having a breaker point, an ampoule in the can containing an electrolyte, and a generally frusto-conical spring washer seated on said flange with the inner rim of the washer supporting the ampoule in spaced relation to the breaker point, said anvil being movable against the spring action of the washer to engage the ampoule with said point through the washer opening, thereby fracturing the ampoule.

References Cited in the file of this patent

UNITED STATES PATENTS

| | | |
|---|---|---|
| 287,924 | Gruson et al. | Nov. 6, 1883 |
| 1,297,653 | Burgess | Mar. 18, 1919 |
| 1,311,678 | Cartwright | July 29, 1919 |
| 2,264,902 | Hill | Dec. 2, 1941 |
| 2,336,701 | Rasmussen | Dec. 14, 1943 |
| 2,403,567 | Wales | July 9, 1946 |

FOREIGN PATENTS

| | | |
|---|---|---|
| 305,287 | Germany | Apr. 18, 1918 |
| 526,800 | Great Britain | Sept. 25, 1940 |